United States Patent [19]

Nuttall

[11] Patent Number: 5,127,887
[45] Date of Patent: Jul. 7, 1992

[54] VEHICLE DRIVELINE

[76] Inventor: John B. Nuttall, Box 1464, Parksville, British Columbia, Canada, V0R 2S0

[21] Appl. No.: 428,110

[22] Filed: Oct. 27, 1989

[51] Int. Cl.⁵ .............................................. F16H 37/08
[52] U.S. Cl. ........................................ 475/2; 475/218; 475/221
[58] Field of Search .................. 475/2, 22, 84, 169, 475/171, 172, 218, 221, 223, 248, 329, 330

[56] References Cited

U.S. PATENT DOCUMENTS

| | | |
|---|---|---|
| 1,483,606 | 2/1924 | Krohn . |
| 1,716,073 | 6/1929 | McFarlane . |
| 2,648,236 | 8/1953 | Wilson ............................ 475/248 X |
| 3,021,725 | 2/1962 | Schneider . |
| 3,053,404 | 10/1962 | Beck . |
| 3,343,620 | 10/1967 | Karavias . |
| 3,412,631 | 11/1968 | Frost ............................... 475/218 X |
| 4,050,534 | 9/1977 | Nelson et al. ................... 475/221 X |
| 4,572,318 | 2/1986 | Cady . |
| 4,709,775 | 12/1987 | Watanabe . |
| 4,819,512 | 4/1989 | Azuma et al. ........................ 475/2 |

FOREIGN PATENT DOCUMENTS

| | | | |
|---|---|---|---|
| 247820 | 12/1987 | European Pat. Off. ............ 475/2 |
| 63-2724 | 1/1988 | Japan ................................ 475/2 |

OTHER PUBLICATIONS

Colbourne, J. R., The Geometric Design of Internal Gear Pairs, 1987, University of Alberta.

Primary Examiner—Wright & Dirk
Attorney, Agent, or Firm—Dellett, Smith-Hill and Bedell

[57] ABSTRACT

A driveline is provided for vehicles with two or more driving wheels in which power is carried between the transmission and each wheel through a parallel shaft differential with two internal gear pairs. A traction balance, connecting the differentials, counterbalances reactive torque. Relative wheel traction is varied by change gears within the traction balance or by control torque applied to traction balance components.

10 Claims, 13 Drawing Sheets

VEHICLE DRIVELINE

TECHNICAL FIELD

This invention refers to a driveline of the balanced reaction type for vehicles with two or more driving wheels.

BACKGROUND

The greatest force which a vehicle wheel can exert parallel to the surface over which it moves depends on the nature of the wheel and of the surface, commonly expressed as a coefficient of friction, and on the force exerted by the wheel in the direction normal to the surface. Distribution of tractive force among driving wheels so as to equalize, to the extend possible, the required coefficient of friction, improves vehicle safety.

Performance of vehicles which carry loads of different weight is improved by means which allow adjustment of relative wheel traction in approximate proportion to static wheel loading. Performance of vehicles required to maneouver rapidly is improved by automatic control of relative wheel traction.

PRIOR ART

The bevel gear differential is widely used to sensibly equalize torque transfer to pairs of driving wheels, to pairs of driving axles, and so on, in constructing vehicles with numbers of driving wheels in the sequence 2, 4, 8, . . . This has two or more radial arms fixed within a rotatable differential gear case, coaxial with an axle and driven through a differential driving gear, attached to the case, by a driving pinion gear. Bevel gear pinions, one on each radial arm, engage both of two face gears whose axes coincide with that of the axle, located on opposite sides of the radial arms. Each face gear is attached to one half-axle. The bevel gear pinions begin to rotate on the radial arms whenever the difference in torque transmitted to or from the face gears overcomes static friction, thereby allowing the half-axles to rotate at different rates.

Modifications of the bevel gear differential, known as limited slip differentials, locking differentials, etc., are used to limit relative half-axle rotation rate when a reduction in friction coefficient or in normal force allows the corresponding driving wheel to spin. These differentials respond automatically to differences in half-axle torque, in rotation rate, or both, to slow one half-axle and so to maintain some torque on the other. These produce sudden changes in relative rotation rate.

U.S. Pat. No. 3,021,725, A. J. R. Schneider, discloses a balanced torque right angle drive applied to a steerable boat propeller. The propeller shaft, with axis at right angles to the drive shaft, is driven through a pair of bevel gears and the resulting reaction torque acts on the propeller shaft housing. On the drive shaft axis, the sun gear of a planetary speed reducer, in the driveline, drives an internal gear through planet gears with axes fixed to a rotatable planet carrier. The reaction torque tending to rotate the planet carrier is utilized to counterbalance that tending to rotate the propeller shaft housing.

U.S. Pat. No. 3,053,404, Beck et al, discloses a four wheel drive mine shuttle car with two wheels on either side driven from a locking differential through longitudinal shafts. These locking differentials are driven by transverse shafts from the face gears of a multiplying traction differential, a modification of the bevel gear differential which intermittently applies a torque to the non-spinning half-axle equal to some multiple of the torque transmitted to the spinning half-axle.

U.S. Pat. No. 3,343,620, A. N. Karavias, discloses a driveline for vehicles with two or more driving wheels. Each wheel is driven from one face gear of a separate bevel gear differential, the remaining face gear and differential driving gear of which are each rotationally connected to either, an adjacent differential or, to the power source. Gears of two differentials are directly connected to the power source so the connections form a closed loop. Equal sized wheels exert sensibly equal tractive force regardless of rotation rates.

U.S. Pat. No. 4,572,318, J. B. Cady, discloses a driveline for four wheeled vehicles with bevel gear differentials in the front and rear axles. The motor drives the planet carrier of a planetary system; the front differential is driven from the sun gear and the rear differential from the annular gear through a standard gear box. This gives ratios of front to rear axle torque from 1:3 to 3:2, without regard to acceleration, as the gear box is shifted from first to top gear.

U.S. Pat. No. 4,709,775, Watanabe et al, disclose a torque control system for four wheel drive vehicles with one bevel gear differential in the front axle and one in the rear. In one embodiment, transmission output torque is carried to each differential through separate, hydraulically actuated, wet disc clutches. In another embodiment, the rear differential is driven directly from the transmission while an hydraulically actuated wet disc clutch is used to vary torque acting on the front differential. In both embodiments the ratio of torque on front and rear axles is maintained by varying clutch slip under control of a computer programmed according to a mathematical model employing vehicle speed, steering angle, and the difference in axle speed as measured at the differential driving pinion gears. The torque ratio may be fixed or varied according to operating conditions. The mathematical model ensures that maximum torque is applied to the rear wheels at high speeds and small steering angles in order to reduce energy loss due to clutch friction.

Colbourne, J. R., "The Geometric Design of Internal Gear Pairs", AGMA, 87, FTM 2, shows that the difference in number of teeth between an internal gear and the cooperating external gear may be as small as five so long as it is possible to assemble the gears axially.

SUMMARY OF THE INVENTION

The object is to provide a driveline for vehicles with two or more driving wheels by which relative wheel traction can be controlled with lower expenditure of energy than required by systems of the prior art.

This invention therefor provides,
1. transmission, in the form of reduction gearing, through which rotary motion is carried and whose reactive torque is held in balance by,
2. a traction balance, which connects reactive members of the transmission through which rotary motion is carried to or from individual wheels, or groups of wheels, and whose balance may be altered by,
3. traction control change gears, changeable manually, and/or by,
4. traction control torque generators, which apply torque to specific traction balance components in response to external signals, and, 5. spin control brakes by which transmission output shafts may be constrained to rotate at a rate proportional to that of their input shafts.

The preferred embodiment of a transmission comprises, a transmission gear case, rotatably supported through, transmission support bearings by the vehicle frame; a transmission input shaft, coaxial with the transmission support bearings; a first external gear, coaxial with and rotationally connected to the transmission input shaft, supported by the transmission case through, first external gear support bearings and in mesh with, a first internal gear with axis parallel to that of the transmission input shaft and supported by the transmission case through, parallel shaft bearings, coaxial with and rotationally connected to, a second external gear, supported by the transmission case through the parallel shaft bearings and in mesh with, a second internal gear, coaxial with the differential input shaft and supported by the transmission case through, second internal gear support bearings and rotationally connected to, transmission output shaft coaxial with the transmission input shaft; a transmission balance gear, coaxial with the transmission support bearings and rotationally connected to the transmission case.

When the transmission input shaft turns at NT revolutions per unit time, the output shaft at NO, and the transmission case at NC, all of positive sign when similarly directed, $$NT - \lambda NO + (\lambda - 1)NC = 0 \tag{1}$$

where $\lambda$ is the transmission speed reduction ratio defined as the ratio, input shaft rotation rate divided by output shaft rotation rate when the transmission case is held fixed. When torque TT, in units of force times distance, is applied to the input shaft, torque TC to the transmission balance gear, and the transmission output shaft applies torque TO to any resisting device, and all are of positive sign when directed parallel to the rotation rate vectors, then, excepting inertial and frictional effects, $$TO = TT + TC, \tag{2a}$$

$$TT = TO/\lambda, \tag{2b}$$

and $$TC = (\lambda - 1)TT. \tag{2c}$$

When the input shaft is rotated at rate NT regardless of input torque TT, the output torque TO may be controlled by varying TC, or, the output shaft rotation rate NO may be controlled by varying NC. Compact transmission of this type, with $\lambda$ close to but greater than unity, are made using a small difference in number of teeth on internal and cooperating external gears.

A traction balance counterbalances the reaction torque acting through the balance gears of n, where n > 1, transmission whose input shafts are driven from a single power source at proportional rates and whose output shafts are rotationally connected to driving wheels, while allowing relative rotation of the balance gears, and comprises an assembly of n−2 bevel gear balancing transmission and 2n−3 connecting gear trains; when n=2, the gear train is a rotational connection between the two transmission balance gears; when n>2, n of the connecting gear trains are rotational connections between the balance gear of a transmission and either of, one face gear, or, the transmission driving gear of a bevel gear balancing transmission the remaining face gears and bevel gear transmission driving gears are rotationally connected by the n−3 gear trains remaining, each of which has such number of gears of such relative diameter that reaction torque acting through the transmission balance gears, is counterbalanced. When torque is applied to traction balance components only through transmission balance gears, the relationship between the rotation rate of balance gears, $NC_i$, and the relative torque exerted by transmission balance gears on the traction balance, $\tau_i$, is $$\sum_{1}^{n} \tau_i NC_i = 0, \tag{3}$$

where $$\tau_i = TC_i / TC_1 \tag{4}$$

By applying equation (1) in the form $$NT_i - \lambda_i NO_i + (\lambda_i - 1)NC_i = 0, \tag{5}$$

equation (3) gives, $$\sum_{1}^{n} [\tau_i \lambda_i / (\lambda_i - 1)] NO_i = \sum_{1}^{n} [\tau_i / (\lambda_i - 1)] NT_i. \tag{6}$$

Equation (6) defines transmission action among n wheels. When n=4, $\tau_i = 1,1,b,b$, $\lambda_i = \lambda$, and $NT_i = NT$, equation (6) becomes, $$NO_1 + NO_2 + b(NO_3 + NO_4) = 2(1 + b)NT/\lambda. \tag{7}$$

Changing the speed ratio of any gear train within the traction balance changes relative $\tau_i$ values which, according to equations (2), changes relative transmission output shaft torque $TO_i$ and so changes relative wheel traction.

A traction control torque generator applies torque to one or more rotatable components of the traction balance without regard to component rotation rate, in response to external signals, thereby changing relative $\tau_i$ values. A traction control torque generator comprises, a bi-directional hydraulic motor with, an output shaft for rotatable connection to a traction balance component and with a first and a second motor fluid port through which pressurized hydraulic fluid is supplied to, and evacuated from, the motor fluid ports; a four-way hydraulic valve with float centre spool, which controls pressure difference within, by controlling fluid flow to, and from, motor fluid ports; and, hydraulic valve control means, by which the position of the float centre spool is varied to control traction control torque generation. Bevel gear control transmission and control gear trains may be used to distribute torque from one traction control torque generator to two or more rotatable traction balance components. A first traction control torque generator may be used to alter relative traction with respect to longitudinal wheel position and a second to alter relative traction with respect to transverse wheel position.

Vehicles with all driving wheels disposed in a straight line at right angles to their direction of motion may be steered by control torque applied to one rotatable component of the traction balance, by a manually controlled traction control torque generator, so as to increase wheel traction on one side of the centreline while decreasing that exerted by wheels on the opposite side.

A spin control brake acts to slow or stop rotation of a transmission case and comprises, a friction brake, which may be rotationally connected directly to the transmission case or to a rotatable component of the cooperating traction balance gear train which is directly connected to the transmission case. Spin control brakes may be actuated manually, by external signal, or by centrifugal governor. Full actuation of a spin control brake forces the corresponding wheel to rotate at $NT/\lambda$ revolutions per unit time.

BRIEF DESCRIPTION OF THE DRAWINGS

Specific embodiments of the invention will now be described, by way of example only, with reference to the accompanying drawings in which.

These drawings illustrate operation of component parts and the manner of making the invention, and merely by way of example, application to specific vehicle types.

Figure 1:
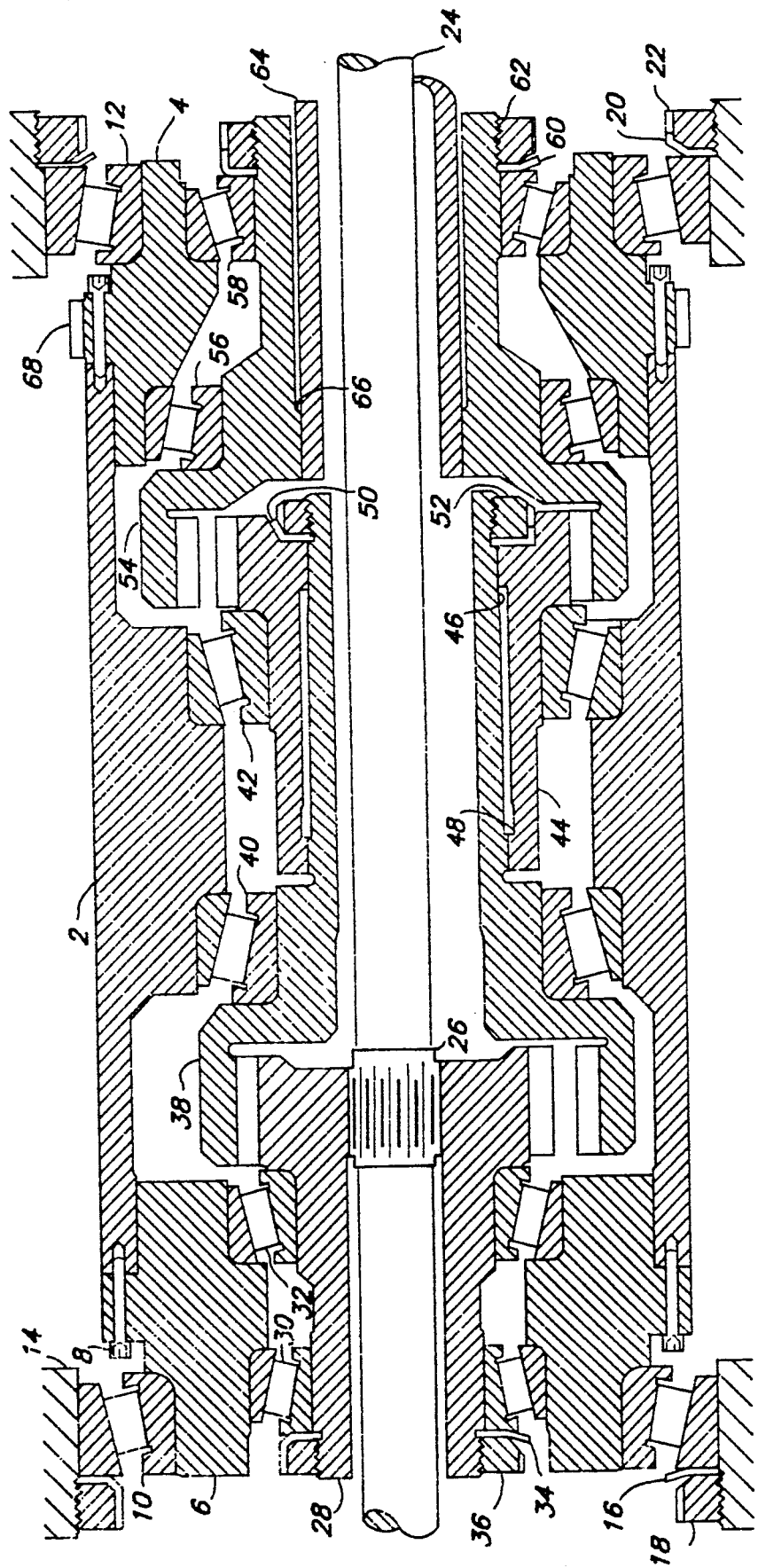
FIG. 1 is a cross-section taken along the axis of a transmission according to the invention.

In the transmission shown by FIG. 1, the differential case consists of transmission tube 2, end hubs 4 and 6, and screws 8. The transmission case is rotatable in differential support bearings 10 and 12, whose outer races are fixed relative to vehicle frame 14 and are held in position by lock washers 16 and 20 and lock nuts 18 and 22, respectively. Transmission input shaft 24, with axis coincident with that of transmission tube 2, is connected through spline 26 to first external gear 28, rotatable about the transmission tube axis in first external gear support bearings 30 and 32 whose outer races are fixed relative to end hub 6, and are held in position by lock washers 34 and lock nut 36. First internal gear 38, in mesh with first external gear 28, is supported on an axis parallel to that of transmission tube 2, through parallel shaft bearings 40 and 42 whose outer races are supported within transmission tube 2. Second external gear 44, coaxial with first internal gear 38 and supported through parallel shaft bearings 40 and 42, is rotationally connected to first internal gear 38 by spline 46 and held in alignment by mating surfaces 48 on first internal gear 38 and on second external gear 44. Lock washer 50 and lock nut 52 hold 38 and 44 in position. Second internal gear 54, which meshes with second external gear 44, is rotatable about the axis of transmission tube 2 in second internal gear bearings 56 and 58, whose outer races are fixed relative to end hub 4 is held in position by lock washer 60 and lock nut 62. Transmission output shaft 64, coaxial with transmission tube 2, is rotationally connected to second internal gear 54 by spline 66. A torque is applied to balance gear 68 to balance the reactive torque generated within the transmission. The assembled transmission is balanced dynamically using well known procedure. Transmission speed reduction ratio close to unity and relatively small transmission tube diameter are achieved using a small difference in number of teeth on internal gears and cooperating external gears. Internal gear pairs are known to experience lower Hertzian stresses and to be more efficient for a given coefficient of friction than are comparable external gear pairs.

Figure 2:
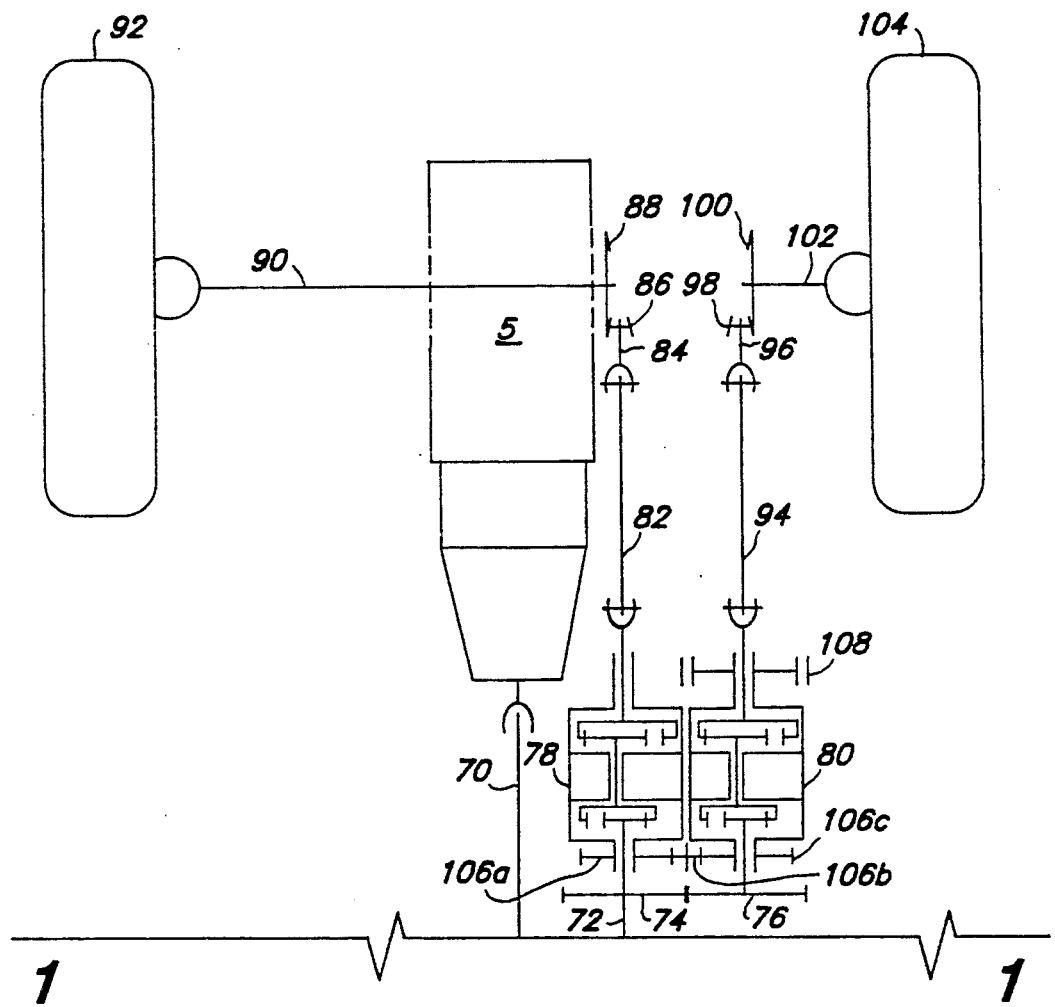
FIGS. 2, 3 and 4 illustrate schematically the invention applied to a vehicle driveline (FIG. 3 joining FIGS. 2 and 4 along lines I—I and II—II), FIG. 2 showing the front wheel drive, FIG. 3 the transfer unit carrying power between the motor and two groups of wheels, and FIG. 4 showing the driveline for a dual axle rear wheel group.
Figure 3:
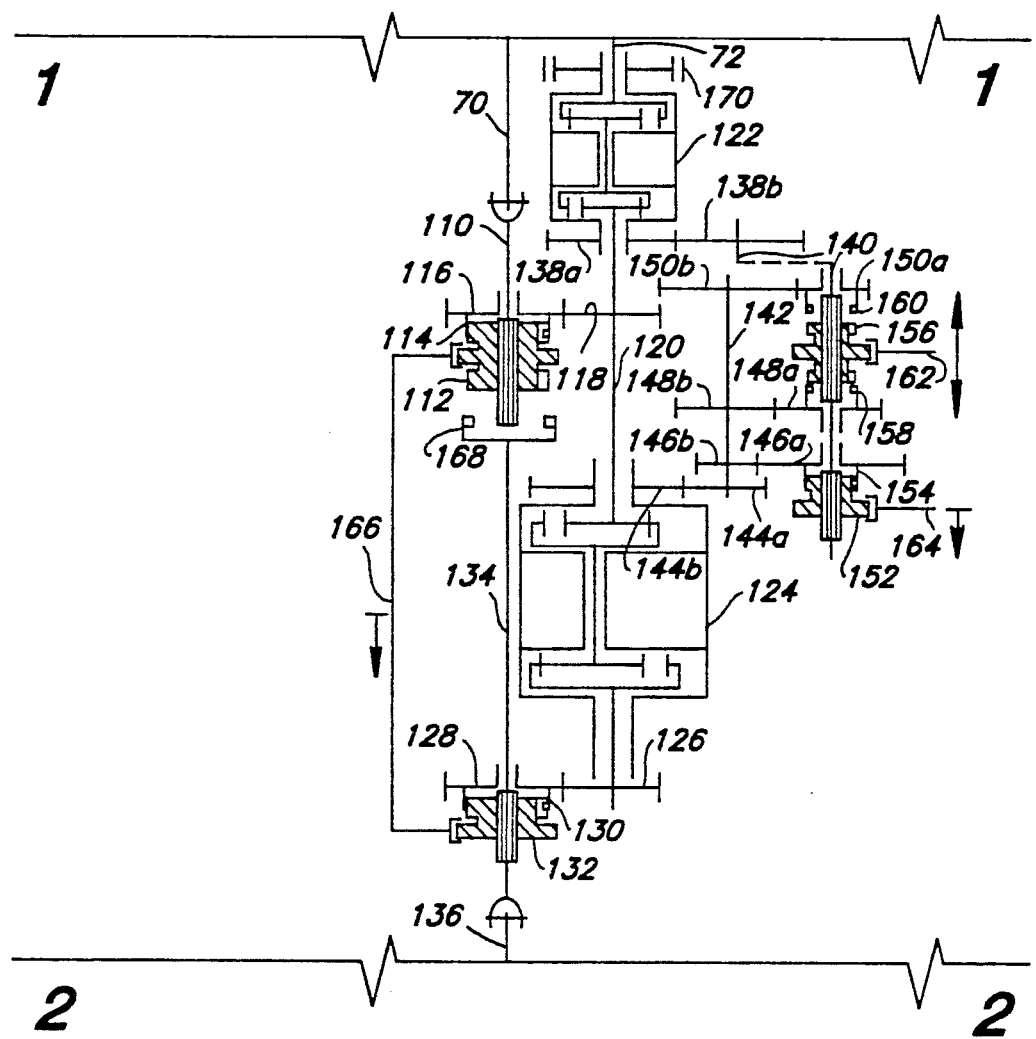

FIGS. 2 through 5 illustrate application to a transport vehicle for off-road use. FIG. 2 shows the driveline of a single axle front wheel group, FIG. 3 shows the transfer unit, FIG. 4 a dualaxle rear wheel group, and FIG. 5, an alternative, triple axle rear wheel group. In FIG. 2 main drive shaft 70 carries power between the power source and the transfer unit of FIG. 3. Power is carried between the transfer unit and the front wheels through shaft 72 when the transfer unit is operated in all wheel drive mode. Gears 74 and 76 connect shaft 72 with transmission 78 and 80 of the type shown in FIG. 1. The output shaft of transmission 78 is rotationally connected, via shafts 82 and 84, gears 86 and 88, and left front drive shaft 90, to wheel 92. The output shaft of transmission 80 is rotationally connected, via shafts 94 and 96, gears 98 and 100, and right front drive shaft 102, to wheel 104. Reaction torque from the transmissions is counterbalanced by the front wheel group traction balance consisting only of gear train 106. Spin control brake 108, a friction brake rotationally connected to the differential case of transmission 80, is used to control wheel spin at low speeds.

The transfer unit of FIG. 3 may be operated in all wheel drive mode, in which traction ratio of front to rear wheel groups is determined by change gear setting, or, in rear wheel drive mode. Splined shaft 110 is a rotational connection between shaft 70 and clutch slider 112. In all wheel drive mode, clutch slider 112 engages internal spline 114 attached to gear 116 which meshes with gear 118 and is rotationally connected to shaft 120 which forms the input shaft to both front wheel group transmission 122 and rear wheel group transmission 124. Shaft 72, the output shaft of front wheel group transmission 122, carries power to, or from, the front wheel group. The output shaft of rear wheel group transmission 124 carries power to, or from, the rear wheel group through gear 126 in mesh with gear 128 and attached internal spline 130, to clutch slider 132 and splined shaft 134, and hence to the rear wheel group through rear drive shaft 136. The transfer unit traction balance, consisting of components 138 through 164, counterbalances reaction torque acting through the balance gears 138a and 144b of group transmissions 122 and 124, respectively. Splined shaft 140 is rotationally connected to balance gear 138a of front wheel group transmission 122 through gear 138b; shaft 142 is rotationally connected to balance gear 144b of rear wheel transmission 124 through gear 144a. Shafts 140 and 142 are rotationally connected at any time by one of gear sub-trains 146, 148, or 150. Clutch slider 152 engages internal spline 154, attached to gear 146a, to connect shafts 140 and 142 via gear sub-train 146; clutch slider 156 engages internal spline 158, attached to gear 148a, to connect shafts 140 and 142 via gear sub-train 148, or, clutch slider 156 engages internal spline 160, attached to gear 150a, to connect shafts 140 and 142 via gear sub-train 150. Clutch forks 162 and 164 controls engagement of clutch sliders 154 and 156; a mechanical interlock, not shown, prevents simultaneous engagement. In rear wheel drive, clutch slider 112 engages internal spline 168, rotationally connected to splined shaft 134, while double clutch fork 166 ensures disengagement of clutch slider 132 from internal spline 130 so rear drive shaft 136 turns at the same rate as shaft 70. Transfer unit spin control brake 170 may be actuated when all wheels of either group tend to spin. (Shaft 136 could also be connected to a standard rear wheel transmission.)

Figure 4:
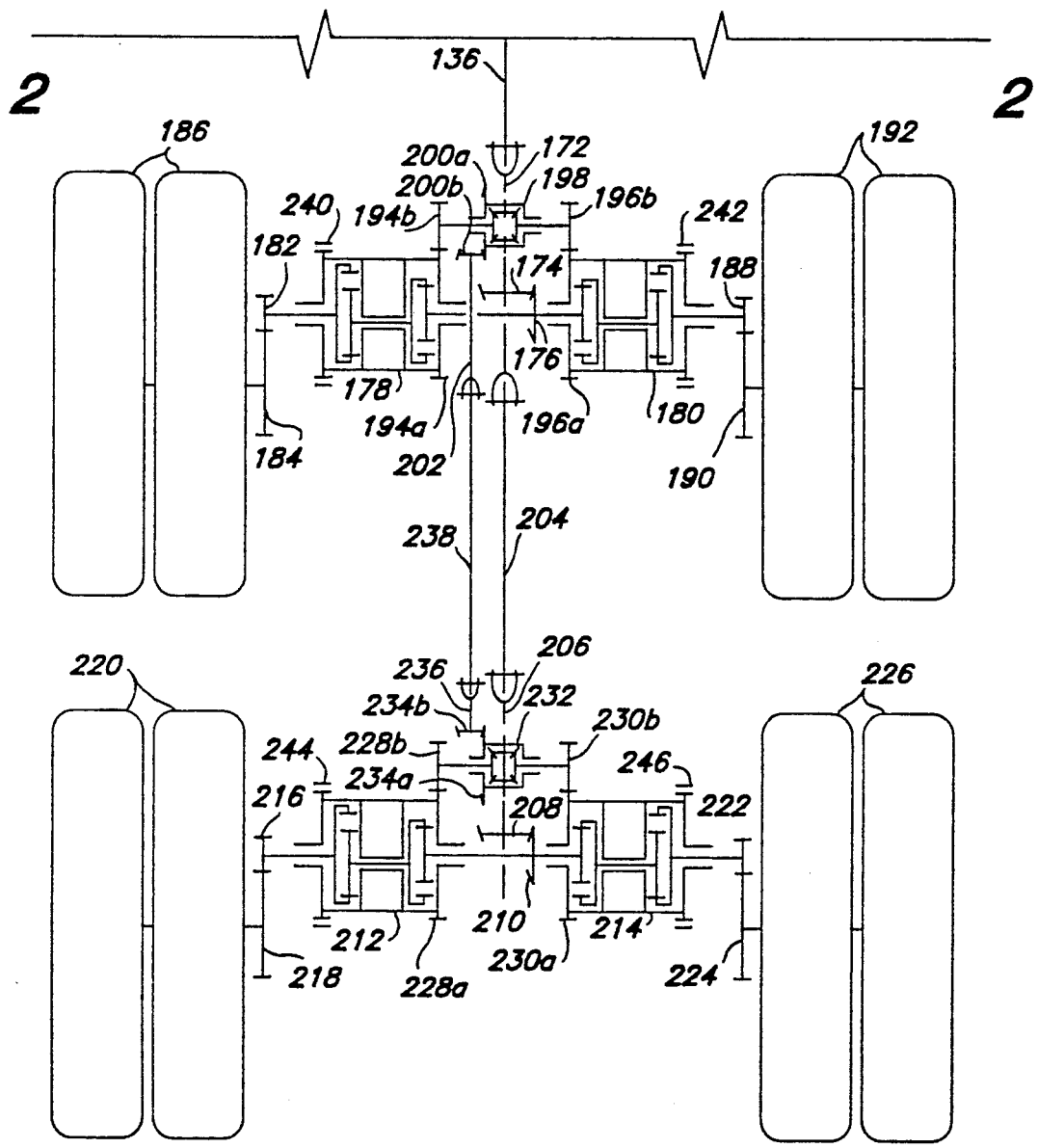

In the dual axle group shown by FIG. 4, components 172 through 200a of the forward axle are identical with components 206 through 234a of the rearward axle. Rear drive shaft 136 carries power to, or from, the group, and is rotationally connected to shaft 172 which is rotationally connected to the input shafts of transmissions 178 and 180 through hypoid gear pair 174 and 176. The output shaft of transmission 178 is rotationally connected to dual wheel 186 through final reduction gears 182 and 184. The output shaft of transmission 180 is rotationally connected to dual wheel 192 through final reduction gears 188 and 190. The dual axle traction balance consists of components 194a through 202 and 228a through 236. Balance gears 194a and 196a of transmissions 178 and 180 mesh with gears 194b and 196b, respectively, which are rotationally connected to the first and second face gears, respectively, of bevel gear balancing transmission 198. Bevel gear balancing transmission 198 acts to equalize and add the reaction torque associated with power transfer through transmissions 178 and 180, and to apply this to shaft 202 through bevel gear 200a, which is rotationally connected to the transmission case of 198, and bevel gear 200b, rotationally connected to shaft 202. Secondary rear drive shaft 204 is a rotational connection between rear drive shaft 136 and shaft 206 through shaft 172. Operation of components 206 through 234b is similar to that of components 172 through 200b, except that shafts 202 and 236 tend to turn in opposite directions when torque is applied through rear drive shaft 136 and resisted by traction. Shaft 238 connects shafts 202 and 236, counterbalancing reaction torque of the two axles. Spin control brakes 240 to 246 inclusive, are actuated manually to control spin within the wheel group.

Figure 5:
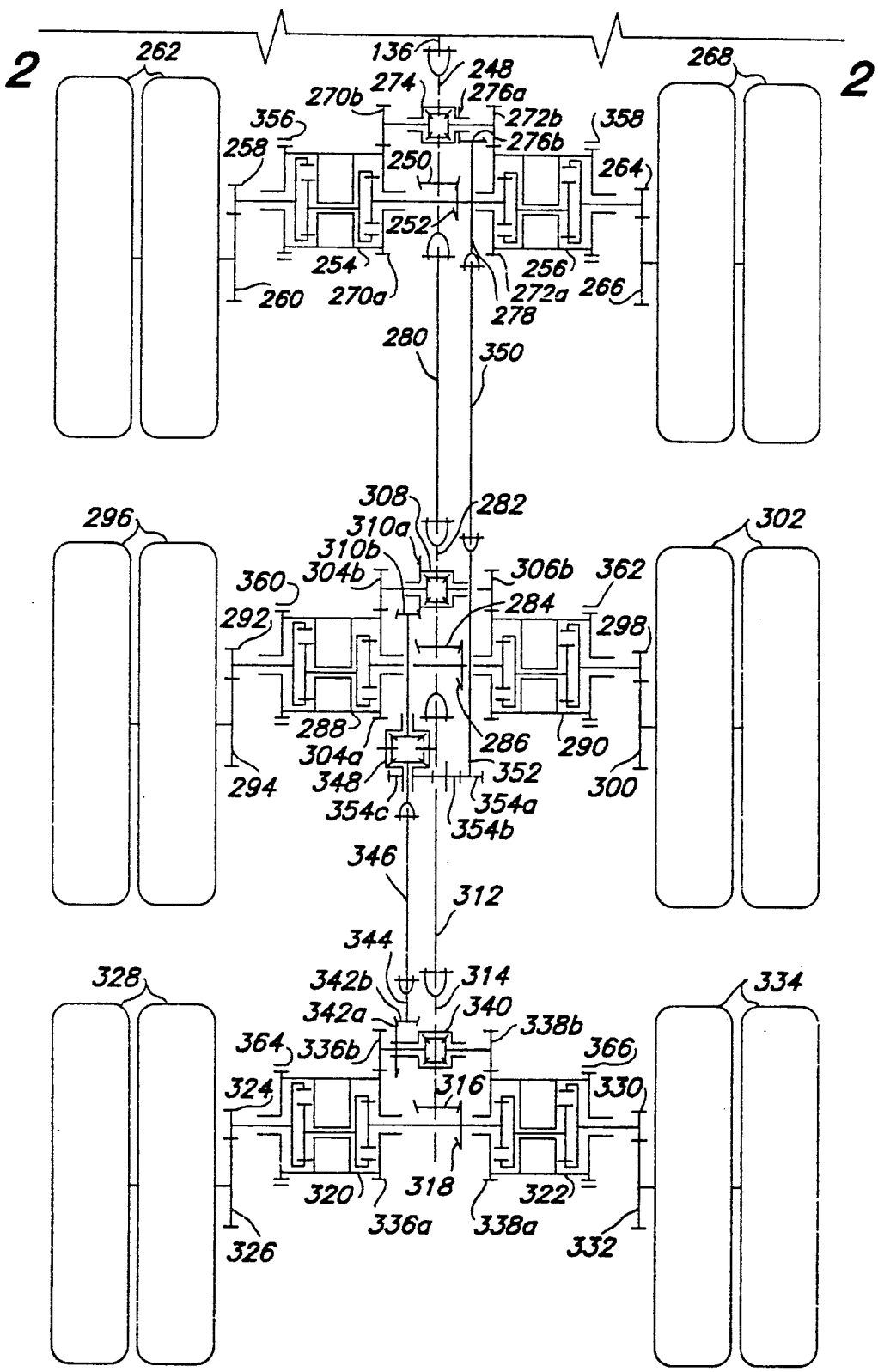
FIG. 5 is a schematic representation of a triple axle rear wheel group incorporating the transmission of the invention.

The triple axle rear wheel group shown by FIG. 5 is an alternative to the dual axle group capable of carrying heavier loads. Rear drive shaft 136 carries power to, or from, the wheel group and is rotationally connected to the forward axle through shaft 248 and hypoid gears 250 and 252, to the centre axle through shaft 248, secondary rear drive shaft 280, shaft 282, and hypoid gears 284 and 286, and to the rear axle through shafts 248, secondary rear drive shaft 280, shaft 282, tertiary rear drive shaft 312, shaft 314, and hypoid gears 316 and 318. The triple axle traction balance consists of components 270a through 278, 304a through 310b and 336a through 354. The case of centre axle bevel gear balancing transmission 308 is rotationally connected to the first face gear of bevel gear balancing transmission 348 through bevel gears 310a and 310b. The rear axle bevel gear balancing transmission 340 is rotationally connected to the second face gear of bevel gear balancing transmission 348 through bevel gears 342a and 342b, shaft 344, and first interaxle balance shaft 346. The forward rear axle bevel gear balancing transmission 274 is rotationally connected to the transmission case of bevel gear balancing transmission 348 through bevel gears 276a and 276b, shaft 278, second interaxle balance shaft 350, shaft 352, and gears 354a through 354c. When driving torque is applied through rear drive shaft 136 and resisted by traction, the two face gears of bevel gear balancing transmission 348 tend to turn in the same direction while reaction torque from the forward axle bevel gear balancing transmission 274 tends to rotate gear 354c in the opposite direction. When bevel gear pairs 276, 310, and 342, are identical, pinion gears of bevel gear transmission 348 exert a torque on the transmission case of 348 which is equal and opposite to that exerted by gear 354c, provided the pitch circle diameter of gear 354a is one-half that of gear 354c. Spin control brakes 356 to 366 inclusive are actuated to control spin of wheels within the group.

One skilled in the mechanical arts will observe that the wheels of each group may have different diameter, that the final reduction gears may be omitted and speed reduction made within the transmission where ground clearance is less critical, and that similarity of components gives some economy. The transfer unit may be used with front or rear axles driven through bevel gear transmissions.

Figure 6:
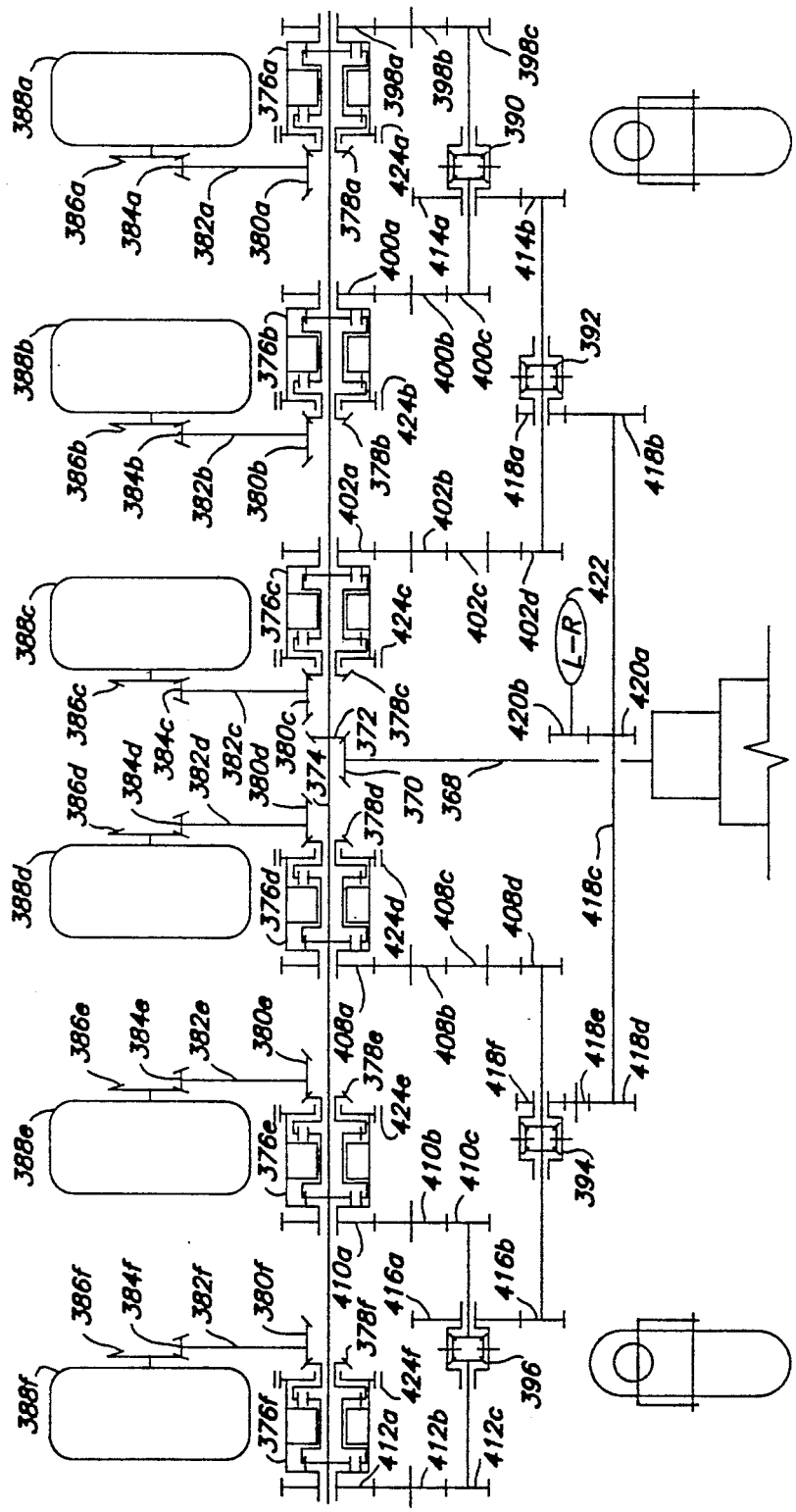
FIG. 6 is a schematic representation of a vehicle driveline with six driving wheels in parallel steered by a traction control torque generator.

FIG. 6 shows the driveline of a vehicle with all driving wheels in parallel in which traction control is used to steer. Main drive shaft 368 carries power to, or from, transverse drive shaft 374 through gears 370 and 372. Transmissions 376, with axes coincident with that of the transverse drive shaft carry power between transverse drive shaft 374 and driving wheels 388 through gears 378, 380, shafts 382, and gears 384 and 386, respectively. The traction balance consists of components 398a through 418f. Opposing face gears of bevel gear balancing transmission 390 are rotationally connected to the transmission cases of transmissions 376a and 376b by gear trains 398 and 400, respectively. Opposing face gears of bevel gear balancing transmission 392 are rotationally connected to the transmission case of transmission 376c through gear train 402, and to the transmission case of bevel gear balancing transmission 390 by gear train 414. Opposing face gears of bevel gear balancing transmission 396 are rotationally connected to the transmission case of transmissions 376e and 376f by gear trains 410 and 412, respectively. Opposing face gears of bevel gear balancing transmission 394 are rotationally connected to the transmission case of transmission 376d through gear train 408 and to the transmission case of bevel gear balancing transmission 396 by gear train 416. The transmission cases of bevel gear balancing transmissions 392 and 394 are rotationally connected by gear train 418. The speed ratio and number of gears in traction balance gear trains 398 to 418 are selected so as to counterbalance torque exerted on the traction balance through the balance gears of the transmissions 376 when driving wheels 388 each exert a predetermined tractive force in response to torque applied through main drive shaft 368. The traction control torque generator 422 consists of a bi-directional hydraulic motor to which hydraulic fluid under pressure is provided and evacuated through the two motor fluid ports under control of a four-way hydraulic valve with float centre spool which is manually controlled when steering. This allows transmission action between all wheels except when the valve spool is at either end of its stroke. Spin control brakes 424 are used to control wheel spin at low speeds. The braking torque at which spin control brakes slip should be less than that which would damage the driveline if all but one wheel encounter negligible resistance to traction.

Figure 7:
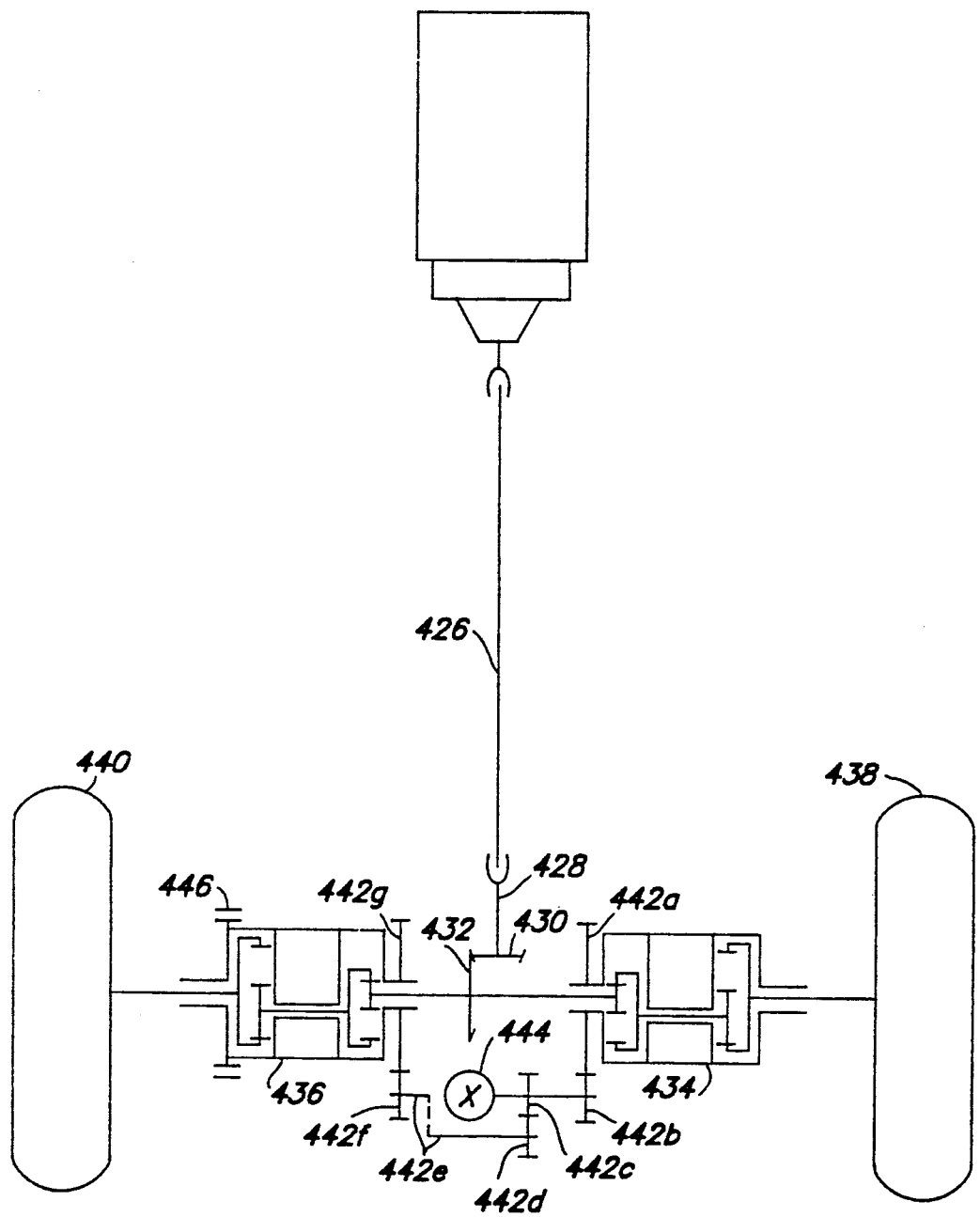
FIG. 7 is a schematic representation of a vehicle driveline with two driving wheels in parallel incorporating traction control.

FIG. 7 shows the driveline of a vehicle with two driving wheels in parallel. Main drive shaft 426 acts through shaft 428 and gears 430 and 432 to carry power to, or from, the common input shaft of transmissions 434 and 436. The output shafts of transmissions 434 and 436 are rotationally connected to wheels 438 and 440, respectively. The traction balance consists of components 442, through which reaction torque of the two transmissions is counterbalanced. When traction control torque generator 444 applies torque to the traction balance, the reaction torque and according to equations (2), the output torque, of one transmission is reduced while those of the other are correspondingly increased. The traction control torque generator may be controlled manually or by an automatic control unit which includes a pressure transducer to measure pressure in each motor fluid port of the traction balance hydraulic motor, data measurement means and data processing means. Measurements of vehicle performance data such as transverse acceleration, steering angle and its rate of change, transmission output torque, etc., are processed by a data processing unit programmed according to a mathematical model appropriate to the vehicle and its service requirements. The data processing unit repeatedly computes optimum traction distribution and from this the required pressure difference between motor fluid ports of the hydraulic motor in the traction balance torque generator. The difference between optimum pressure difference is used to continuously correct the spool position of the hydraulic valve. Actuation of spin control brake 446 slows or stops rotation of the transmission cases and so forces the wheel rotation rates toward the average.

FIGS. 10, 11, 12 and 13 illustrate the traction control torque generator 444 in further detail. Balance gears 634 and 635 operate in conjunction with gears 647 and 652. Shaft 648 connects gear 647 to gear 649. Shaft 651 connects gear 650 to gear 652. Output shaft 654 of torque generator 444 connects to gear 649.

Shaft 654 is coaxial with and connected to driven motor gear 659. Driving motor gear 660 meshes with driven motor gear 659. Both are mounted for cooperation within gear cavity 661 in motor case 662 and both are supported by bearings fixed within backplate 663 and faceplate 664. Wear plates 665 and 666 are located at either end of the driving motor and driven motor gear pair and gear support shafts, not shown, pass through the wear plates.

Figure 12:
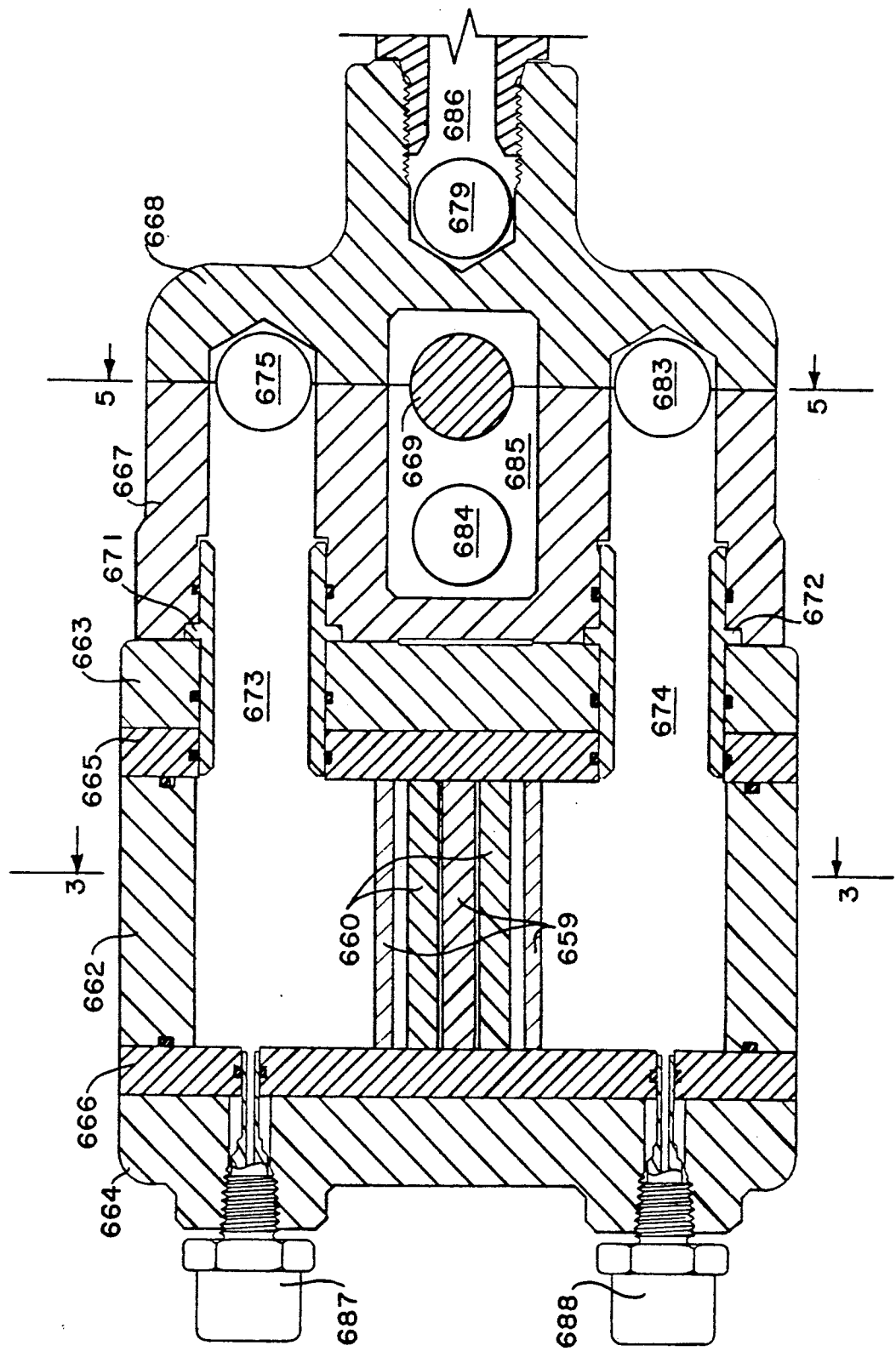
FIG. 12 is a longitudinal cross-sectional view of the hydraulic torque converter taken along lines 4—4 of FIG. 11.
Figure 13:
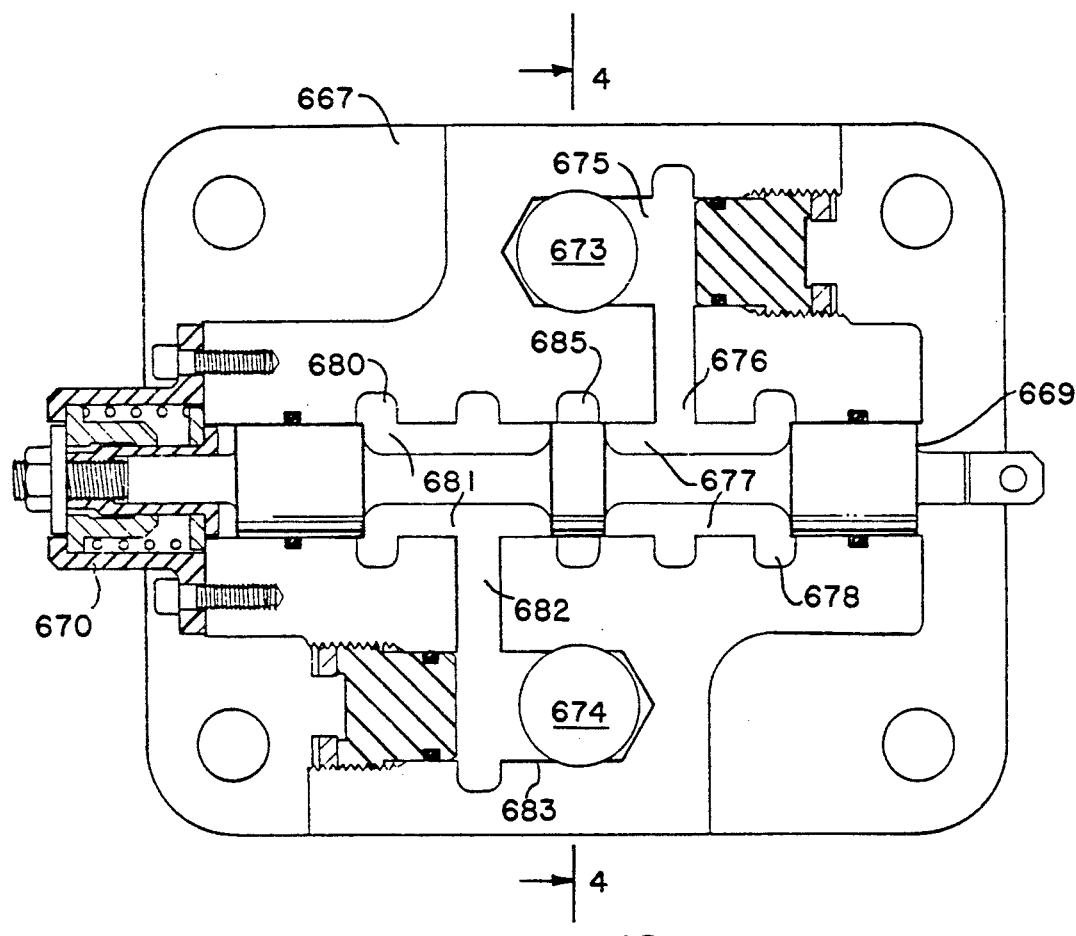
FIG. 13 is a cross-sectional view of the hydraulic torque converter taken along lines 5—5 of FIG. 10.

The hydraulic control valve shown on FIG. 12 and 13 is attached to the hydraulic motor and consists of valve base 667, valve cap 668, valve spool 669 and valve centring unit 670. Sleeves 671 and 672 position valve base 667 relative to motor back plate 663 and form motor fluid ports 673 and 674, respectively, through which hydraulic fluid flows between the hydraulic control valve and gear activity 661.

With valve spool 669 centred as shown in FIG. 13, fluid flows between motor fluid ports 673 and 674 through bore 675, valve channel 676, valve spool cavity 677, valve channel 678 (which connects valve spool cavity 677 with low pressure bore 679), valve spool cavity 681, valve channel 682, and bore 683. Pressurized hydraulic fluid is provided from hydraulic pressure supply 655, through high pressure bore 684 and valve channel 685.

When valve spool 669 is displaced axially from the centred position shown in FIG. 13, the valve spool centre land moves to admit fluid from valve channel 685 to one valve spool cavity while the corresponding valve spool end land moves so as to restrict flow to low pressure bore 679. The resulting increased pressure is communicated to the corresponding motor fluid port while that within the remaining motor fluid port is substantially that within low pressure valve port 686, as provided by pressurized hydraulic fluid supply 655. Pressure transducers 687 and 688 shown in FIG. 12 measure pressures in motor case cavity 661 associated with motor fluid ports 673 and 674, respectively, and transmit these measurements to electronic computing unit (ECU) 656. The ECU receives values of measured variables such as acceleration components, wheel speeds, steering angle, driveline torque etc. and processes these according to a mathematical model appropriate to the vehicle and its service requirements, to obtain control torque. The correction in valve spool position necessary to provide the pressure difference between motor fluid ports corresponding to the required control torque is calculated and communicated to valve spool 669 through valve control means 657 and connecting rod 658. This correction is performed repeatedly.

Figure 8:
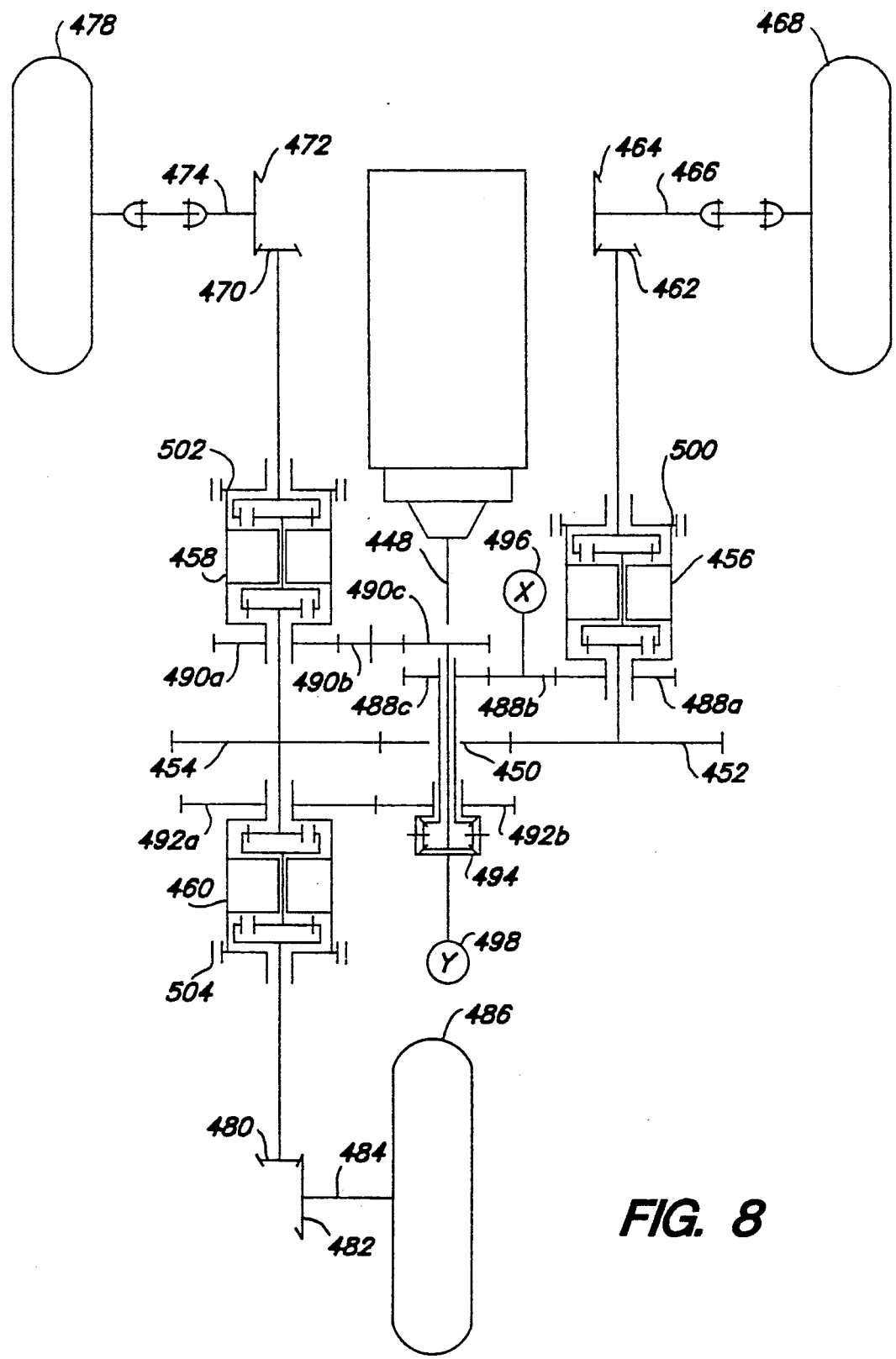
FIG. 8 is a schematic representation of a vehicle driveline with three driving wheels incorporating longitudinal and transverse traction control.

FIG. 8 shows the invention applied to the driveline of a vehicle with three driving wheels. Main drive shaft 448 acts through gears 450, 452, and 454 to carry power to, and from, transmissions 456, 458, and 460. The output shafts of transmissions 456, 458, and 460 are rotationally connected to wheels 468, 478, and 486, respectively through gears 462 and 464, 470 and 472, and 480 and 482, and shafts 466, 474 and 484, respectively. The traction balance consists of components 488a to 494 inclusive. Gear trains 488 and 490 are rotational connections between the transmission case of transmission 456 and 458, and the first and the second face gears, respectively, of bevel gear balancing transmission 494. Gear train 492 is a rotational connection between the differential case of differential 460 and the transmission case of bevel gear balancing transmission 494. The speed ratios of gear trains 488, 490, and 492 are made so bevel gear balancing transmission 494 counterbalances reaction torque from transmissions 456, 458, and 460 when traction forces are in the ratio required for normal operation. The transverse traction control torque generator 496, applies control torque to the traction balance through gear 488b. When negligible wheel slip occurs, a torque, independent of rotation rate, applied by 496 changes that torque counteracting reaction torque of transmission 456, and equations (2) show that both output and input torque of transmission 456 must change by corresponding amounts as must the tractive force applied by wheel 468. The change in input torque to transmission 456 from gear 450 then acts with opposite effect on gear 454 and so on the input shafts of transmission 458 and 460, changing output and reaction torque as well as tractive force exerted by wheels 478 and 486. The changed reaction torque of transmission 458 and 460 act through gear trains 490 and 492, bevel gear balancing transmission 494, and gear 488c to balance the reactive torque of 456 plus the traction control torque. This changes traction exerted by wheel 468 in one direction and that exerted by wheels 478 and 486 by a corresponding total amount, in the opposite direction. The longitudinal control torque generator acts directly on the case of bevel gear balancing transmission 494 to change traction exerted by wheel 486 in one direction and the total traction on wheels 468 and 478 in the opposite direction. Where vehicle service requires, an automatic traction control unit programmed to continuously adjust the two traction torque generators is used. Each of spin control brakes 500, 502, and 504, when applied, acts to slow or stop rotation of the associated transmission case, forcing the corresponding wheel toward a rate of rotation directly proportional to that of main drive shaft 448.

Figure 9:
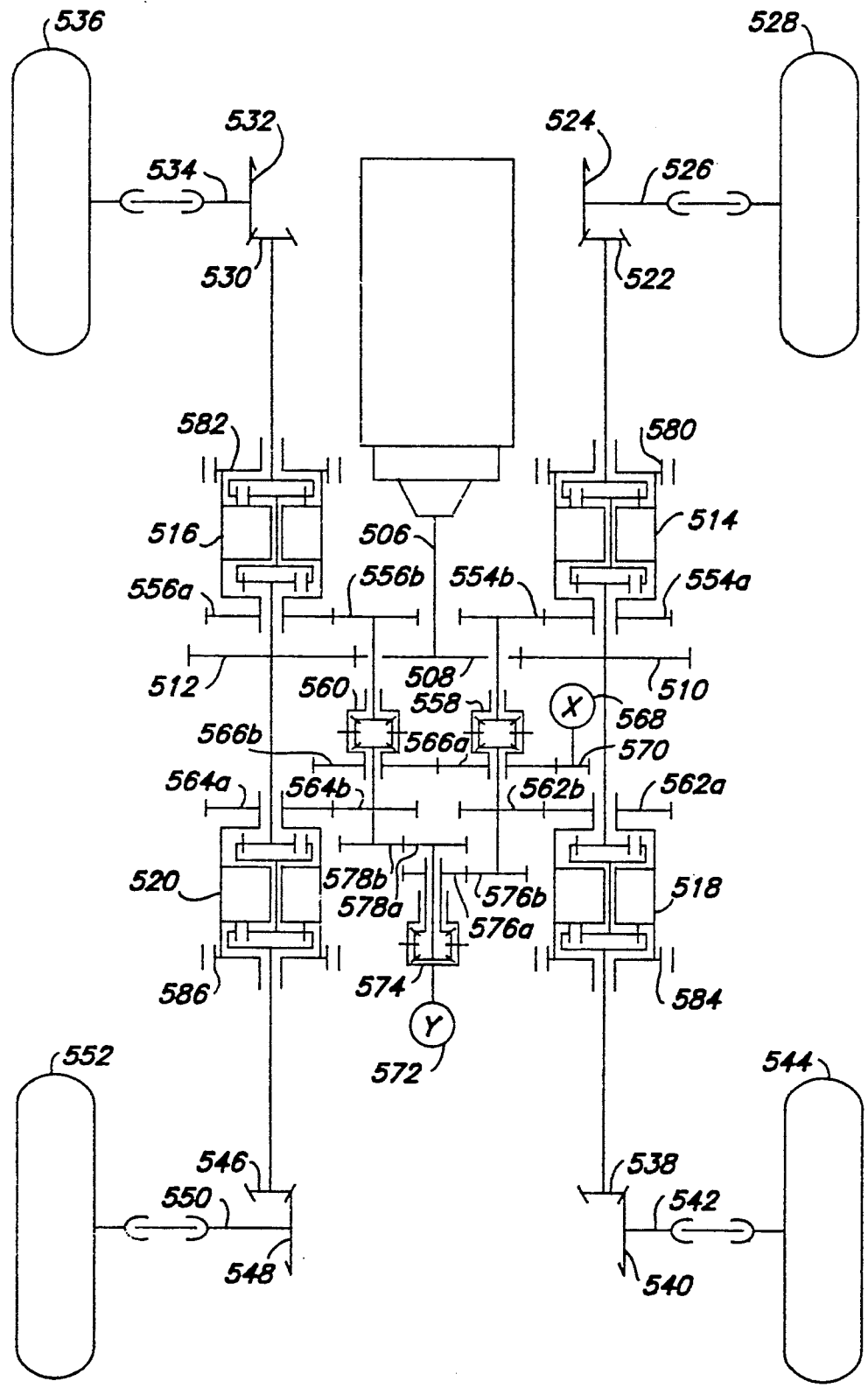
FIG. 9 is a schematic representation of a vehicle driveline with four driving wheels incorporating longitudinal and transverse traction control.
Figure 10:
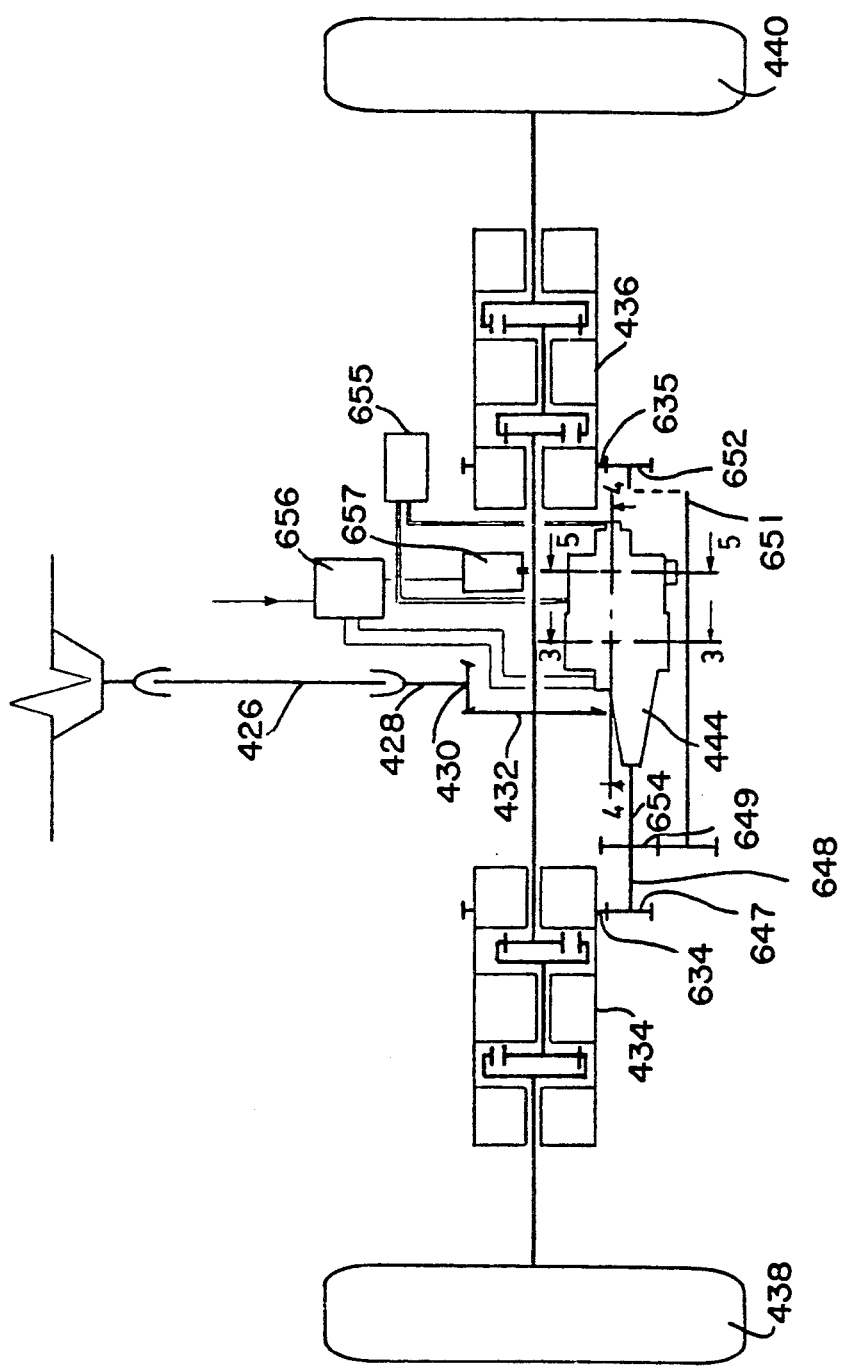
FIG. 10 is a schematic diagram showing the embodiment of FIG. 7 with a more detailed illustration of the traction control torque converter.
Figure 11:
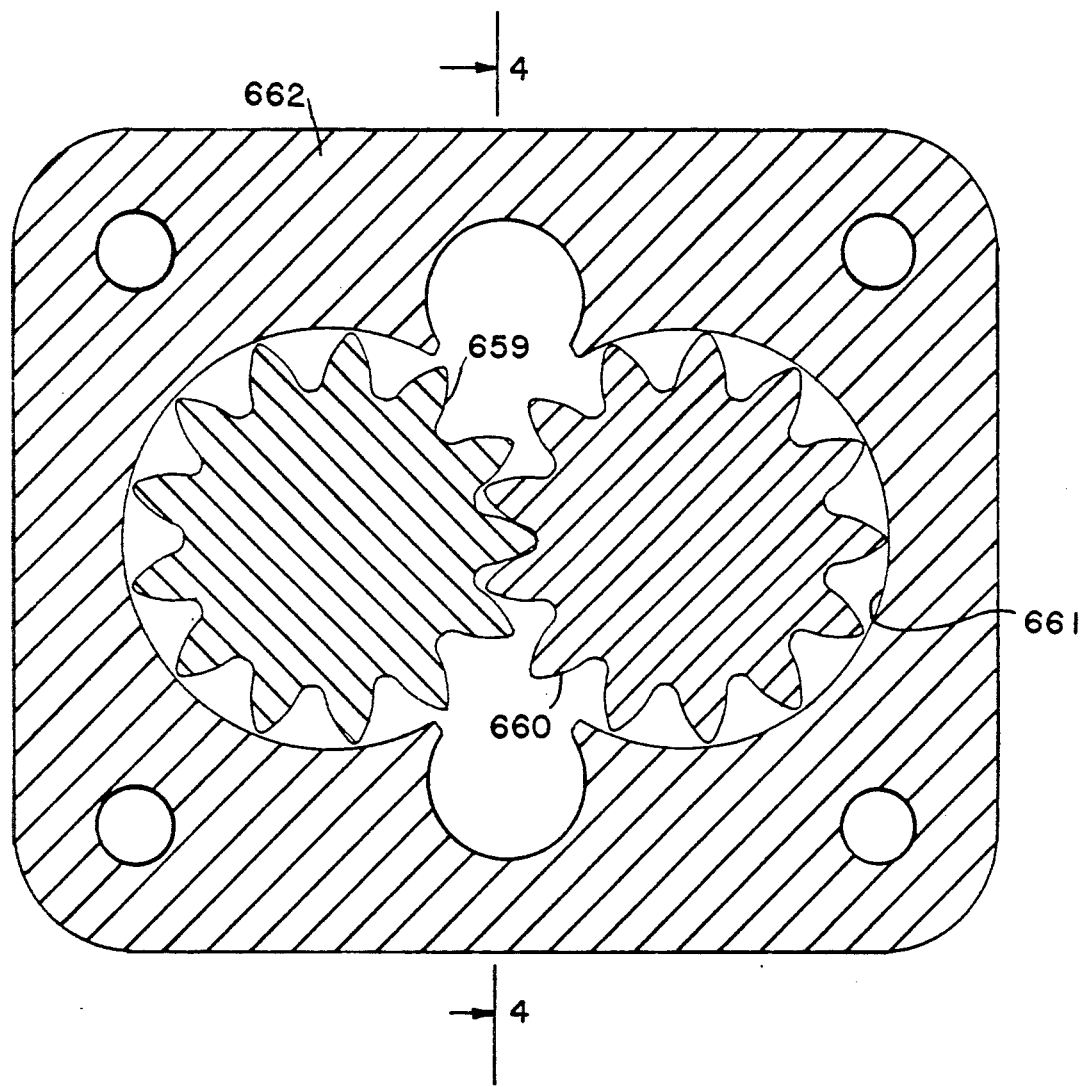
FIG. 11 is a transverse sectional view of the hydraulic torque converter shown in FIG. 7, taken along lines 3—3 of FIG. 10.

The driveline of a vehicle with four driving wheels is shown by FIG. 9. Main drive shaft 506 acts through gears 508, 510, and 512 to carry power to, or from, transmissions 514 through 520. Transmissions 514 through 520 are rotationally connected to wheels 528, 536, 544 and 552 through gears 522 and 524, 530 and 532, 538 and 540, and 546 and 548, shafts 526, 534, 542, and 550, respectively. The traction balance consists of components 554a to 566b inclusive. Gear trains 554 and 556 are rotational connections between transmission cases of transmissions 514 and 516, respectively, and the first face gears of bevel gear balancing transmissions 558 and 560, respectively. Gear trains 562 and 564 are rotational connections between transmission cases of transmissions 518 and 520, respectively, and the second face gears of bevel gear balancing transmissions 558 and 560, respectively. Gear train 566 is a rotational connection between the transmission cases of bevel gear balancing transmissions 558 and 560. The speed ratio of each of the gear trains 554, 556, 562, 564, and 566, is selected so the torque exerted by bevel gear balancing transmission 558 on gear 566a counterbalances the torque exerted by bevel gear balancing transmission 560 on gear 566b when wheel tractive forces are in the ratio required for normal operation. Transverse traction control torque generator 568 applies control torque to traction balance gear 566a through gear 570, thereby changing traction exerted by wheels 528 and 544 in one direction while changing traction exerted by wheels 536 and 552 in the opposite direction. Longitudinal traction control torque generator 572 applies control torque directly to the transmission case of bevel gear transmission 574, which distributes this to gears 562b and 564b and thereby changes traction exerted by wheels 528 and 536 in one direction while changing that exerted by wheels 544 and 552 in the opposite direction. Where vehicle service requires, an automatic traction control unit, programmed to continuously adjust torque applied by the traction control torque generators, is used. Spin control brakes 580 through 586 operate as described for a driveline with three driving wheels.

Change gears incorporated in gear trains of a traction balance allow adjustment of relative wheel traction only in finite steps and are applicable to vehicles which carry loads of markedly different weights. Traction control torque generators are able to continuously adjust relative wheel traction and have wider application. The technology used in making automatic traction control units is well known. Spin control brakes allow direct operator control at low speed, eliminating the sudden uncontrolled changes in relative wheel traction associated with some drivelines of the prior art.

I claim:

1. A differential comprising:
   (a) an input shaft;
   (b) an output shaft coaxial with said input shaft;
   (c) a differential case mounted for coaxial rotation about said input shaft;
   (d) means rotatably supporting said differential case;
   (e) a first external gear coaxial with and connected to said input shaft;
   (f) means for rotatably supporting said first external gear within said differential case;
   (g) a first internal gear cooperating with said first external gear and mounted on a hollow gear-bearing shaft rotatable about an axis fixed relative to said differential case and parallel to and offset from the axis of said input shaft;
   (h) a second external gear mounted on said gear-bearing shaft at a location axially spaced from said first internal gear;
   (i) means rotatably supporting said first internal gear and said second external gear within said differential case;
   (j) a second internal gear cooperating with said second external gear mounted coaxially with and rotationally connected to said output shaft;
   (k) means rotatably supporting said second internal gear within said differential case; and
   (l) coupling means by which torque may be transferred to or from said differential case.

2. The transmission of claim 1 wherein said coupling means comprises a gear mounted coaxially with and rotatably connected to said differential case.

3. The transmission of claim 1 wherein each external gear has at least 5 and less than 7 fewer teeth than its cooperating internal gear.

4. The transmission of claim 1 wherein said first internal gear and said second external gear are mounted on a common hollow shaft rotatable about an axis parallel to and offset from the axis of said input shaft.

5. The transmission of claim 4 wherein said output shaft is hollow and said input shaft is mounted coaxially and concentrically within said output shaft.

6. The transmission of claim 5 wherein said parallel shaft is hollow and said input shaft extends through said parallel shaft.

7. The transmission of claim 1 wherein said means for supporting said transmission case comprises a vehicle frame.

8. A vehicle comprising a source of rotational power, two or more wheels and the transmission of claim 1.

9. A driveline for a vehicle comprising two driving wheels, said driveline comprising a transmission of the type described in claim 1 associated with each of said driving wheels, and wherein said coupling means of each said transmission are connected by coupling gear means.

10. A driveline for a vehicle comprising a driving shaft in drivable connection with an intermediates shaft, two driven shafts and a transmission of the type described in claim 1 associated with said intermediate shaft and each of said driven shafts wheels, and wherein said coupling means of each said transmission are connected by coupling gear means, further comprising a control torque generator whereby control torque is applied to said coupling gear means, said traction control torque generator comprising:
 a) a bi-directional hydraulic motor having an output shaft for connection to said transfer gearing and a first and second motor fluid port;
 b) first and second pressure transducers connected to measure pressure in said first and second motor fluid ports and to communicate said measurements;
 c) hydraulic fluid pressure control means whereby fluid pressure difference between said first and second motor fluid ports is controlled;
 d) data measurement means whereby vehicle performance variables are measured and transmitted; and
 e) data processing means, for receiving transmitted data, computing required corrections in pressure difference between said first and second motor fluid ports and transmitting said difference to said hydraulic fluid pressure control means.

* * * * *